(12) United States Patent
Asteman et al.

(10) Patent No.: US 9,875,852 B2
(45) Date of Patent: Jan. 23, 2018

(54) USE OF MIXTURES OF SELF-DOPED AND FOREIGN-DOPED CONDUCTIVE POLYMERS IN A CAPACITOR

(71) Applicant: Heraeus Precious Metals GmbH & Co. KG, Hanau (DE)

(72) Inventors: Katrin Asteman, Köln (DE); Matthias Intelmann, Köln (DE); Udo Merker, Köln (DE); Knud Reuter, Krefeld (DE); Armin Sautter, Düsseldorf (DE)

(73) Assignee: Heraeus Precious Metals GmbH & Co. KG, Hanau (DE)

( * ) Notice: Subject to any disclaimer, the term of this patent is extended or adjusted under 35 U.S.C. 154(b) by 291 days.

(21) Appl. No.: 14/431,418

(22) PCT Filed: Sep. 25, 2013

(86) PCT No.: PCT/EP2013/002871
§ 371 (c)(1),
(2) Date: Mar. 26, 2015

(87) PCT Pub. No.: WO2014/048562
PCT Pub. Date: Apr. 3, 2014

(65) Prior Publication Data
US 2015/0255221 A1 Sep. 10, 2015

Related U.S. Application Data

(60) Provisional application No. 61/711,369, filed on Oct. 9, 2012.

(30) Foreign Application Priority Data

Sep. 27, 2012 (DE) ........................ 10 2012 018 976

(51) Int. Cl.
*H01G 9/00* (2006.01)
*H01G 9/02* (2006.01)
(Continued)

(52) U.S. Cl.
CPC ........... *H01G 9/042* (2013.01); *H01G 9/0036* (2013.01); *H01G 9/012* (2013.01); *H01G 9/025* (2013.01);
(Continued)

(58) Field of Classification Search
CPC .......... H01G 9/048; H01G 9/042; H01G 9/07; H01G 9/012; H01G 9/025
(Continued)

(56) References Cited

U.S. PATENT DOCUMENTS

| 4,910,645 A | 3/1990 | Jonas et al. |
| 6,635,729 B1 | 10/2003 | Groenendaal et al. |

(Continued)

FOREIGN PATENT DOCUMENTS

| DE | 102004022674 | 11/2005 |
| DE | 102005043828 | 3/2007 |

(Continued)

OTHER PUBLICATIONS

PCT International Preliminary Report on Patentability in PCT/EP2013/002871, dated Mar. 31, 2015, 10 pages.
(Continued)

*Primary Examiner* — Eric Thomas
*Assistant Examiner* — Arun Ramaswamy
(74) *Attorney, Agent, or Firm* — Servilla Whitney LLC

(57) ABSTRACT

Described are methods for the production of a capacitor, comprising the process steps:
a) the provision of an electrode body (1) of an electrode material (2), wherein a dielectric (3) covers one surface (4) of this electrode material (2) at least partly under formation of an anode body (5);
b) the introduction of a dispersion comprising a dispersing agent, a foreign-doped conductive polymer and counter-
(Continued)

ions which are not covalently bonded to the foreign-doped conductive polymer into at least a part of the anode body (5);

c) the at least partial removal of the dispersing agent under obtaining a solid electrolyte (6) in a capacitor body;

wherein a self-doped conductive polymer is additionally introduced into at least a part of the anode body (5). Also described are capacitors obtainable by these methods, capacitors, electronic circuits, the use of these capacitors and dispersions.

19 Claims, 1 Drawing Sheet

(51) Int. Cl.

| | | |
|---|---|---|
| *H01G 9/04* | (2006.01) | |
| *H01G 9/145* | (2006.01) | |
| *H01G 9/042* | (2006.01) | |
| *H01G 11/48* | (2013.01) | |
| *H01G 11/56* | (2013.01) | |
| *H01G 9/012* | (2006.01) | |
| *H01G 9/025* | (2006.01) | |
| *H01G 9/048* | (2006.01) | |
| *H01G 9/07* | (2006.01) | |

(52) U.S. Cl.
CPC ............... *H01G 9/048* (2013.01); *H01G 9/07* (2013.01); *H01G 11/48* (2013.01); *H01G 11/56* (2013.01); *Y02E 60/13* (2013.01); *Y02T 10/7022* (2013.01)

(58) Field of Classification Search
USPC .................. 361/523, 525, 508; 252/62.2
See application file for complete search history.

(56) References Cited

U.S. PATENT DOCUMENTS

| | | |
|---|---|---|
| 7,497,879 B2 | 3/2009 | Kakuma et al. |
| 8,456,803 B2 | 6/2013 | Merker et al. |
| 8,696,768 B2 | 4/2014 | Merker et al. |
| 8,699,208 B2 | 4/2014 | Merker et al. |
| 8,710,177 B2 | 4/2014 | Sugihara et al. |
| 8,882,856 B2 | 11/2014 | Intelmann et al. |
| 2005/0237696 A1 | 10/2005 | Takeda et al. |
| 2008/0290324 A1* | 11/2008 | Louwet .................... C08K 5/13 252/500 |
| 2011/0164348 A1 | 7/2011 | Merker et al. |

FOREIGN PATENT DOCUMENTS

| | | |
|---|---|---|
| DE | 102009007594 | 8/2010 |
| DE | 102011013068 | 9/2012 |
| EP | 0340512 | 11/1989 |
| EP | 1122274 | 8/2001 |
| JP | 2008214587 A | 9/2008 |
| JP | 2012169682 | 9/2012 |
| WO | WO-03/054052 | 7/2003 |
| WO | WO-2009/141209 | 11/2009 |
| WO | WO-2010/003874 | 1/2010 |
| WO | WO-2012/041506 | 4/2012 |

OTHER PUBLICATIONS

PCT International Search Report in PCT/EP2013/002871, dated May 21, 2014, 5 pages.

PCT International Written Opinion in PCT/EP2013/002871, dated May 21, 2014, 9 pages.

\* cited by examiner

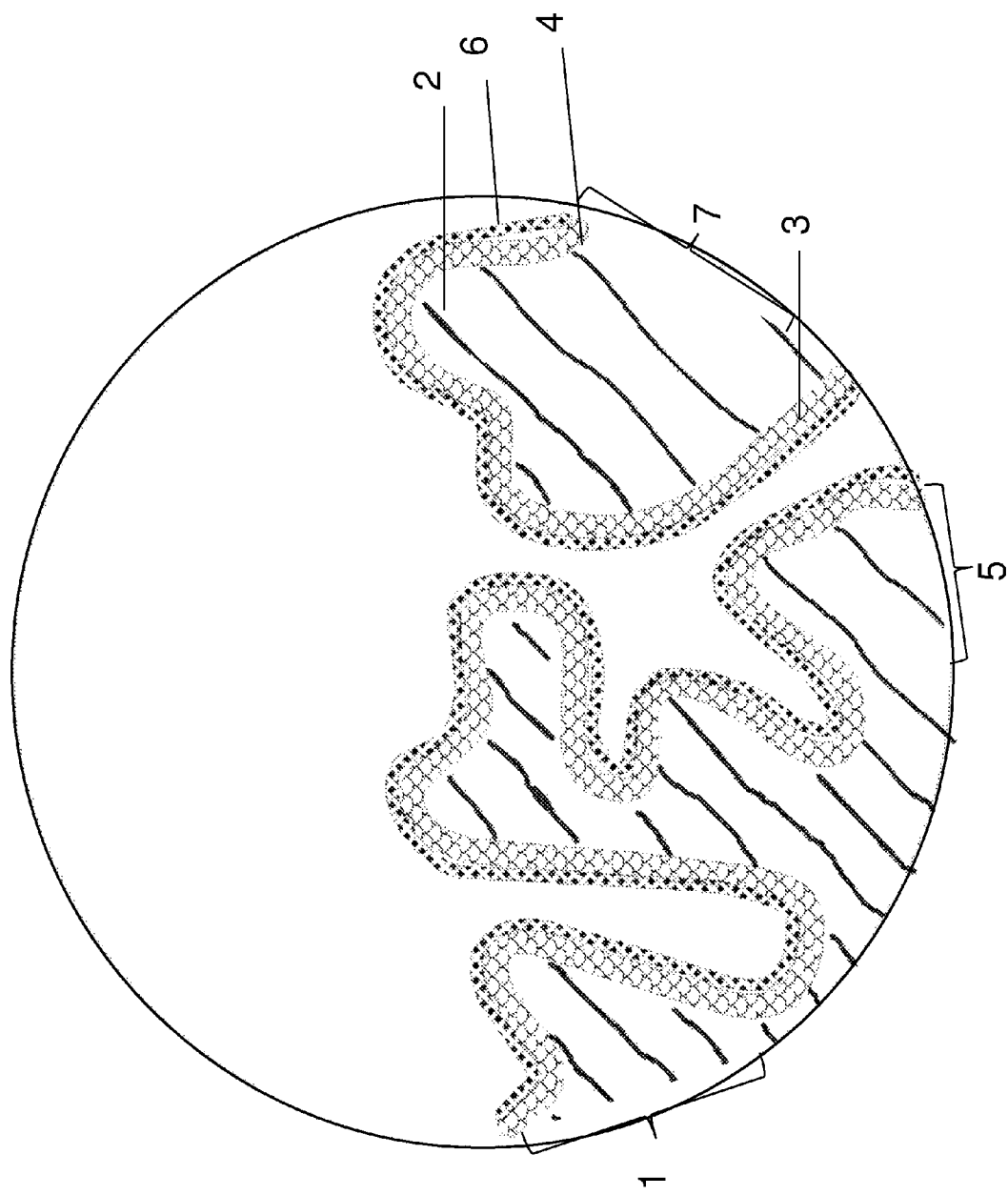

USE OF MIXTURES OF SELF-DOPED AND FOREIGN-DOPED CONDUCTIVE POLYMERS IN A CAPACITOR

CROSS-REFERENCE TO RELATED APPLICATIONS

This application is a national phase entry of PCT Application No. PCT/EP2013/002871, filed Sep. 25, 2013, which claims priority to U.S. Provisional Application No. 61/711,369 filed Oct. 9, 2012 and German Application No. 10 2012 018 976.1, filed Sep. 27, 2012, the entire contents of which are hereby incorporated by reference.

FIELD

The present invention relates to a process for the production of a capacitor, the capacitor obtainable by this process, a capacitor, electronic circuits, the use of a capacitor and a dispersion.

BACKGROUND

A commercially available electrolytic capacitor as a rule is made of a porous metal electrode, an oxide layer serving as a dielectric on the metal surface, an electrically conductive material, usually a solid, which is introduced into the porous structure, an outer electrode (contacting), such as e.g. a silver layer, and further electrical contacts and an encapsulation. An electrolytic capacitor which is frequently used is the tantalum electrolytic capacitor, the anode electrode of which is made of the valve metal tantalum, on which a uniform, dielectric layer of tantalum pentoxide has been generated by anodic oxidation (also called "forming"). A liquid or solid electrolyte forms the cathode of the capacitor. Aluminium capacitors in which the anode electrode is made of the valve metal aluminium, on which a uniform, electrically insulating aluminium oxide layer is generated as the dielectric by anodic oxidation, are furthermore frequently employed. Here also, a liquid electrolyte or a solid electrolyte forms the cathode of the capacitor. The aluminium capacitors are usually constructed as wound- or stacked-type capacitors.

π-conjugated polymers are particularly suitable as solid electrolytes in the capacitors described above because of their high electrical conductivity. π-conjugated polymers are also called conductive polymers or synthetic metals. They are increasingly gaining economic importance, since polymers have advantages over metals with respect to processability, weight and targeted adjustment of properties by chemical modification. Examples of known n-conjugated polymers are polypyrroles, polythiophenes, polyanilines, polyacetylenes, polyphenylenes and poly(p-phenylene-vinylenes), a particularly important polythiophene used industrially being poly(3,4-ethylenedioxythiophene) (PEDOT), since it has a very high conductivity in its oxidized form.

The solid electrolytes based on conductive polymers can be applied to the oxide layer in various ways. EP-A-0 340 512 thus describes, for example, the production of a solid electrolyte from 3,4-ethylenedioxythiophene and the use thereof in electrolytic capacitors. According to the teaching of this publication, 3,4-ethylenedioxythiophene is polymerized on to the oxide layer in situ.

The disadvantage of the production of solid electrolytic capacitors using an in situ polymerization is however, amongst others, the complexity of the process. Thus, a polymerization process which in each case includes the process steps of impregnation, polymerization and washing as a rule lasts several hours. Under certain circumstances, readily flammable or toxic solvents must also be employed here. A further disadvantage of the in situ process for the production of solid electrolytic capacitors is that as a rule anions of the oxidizing agent or, where appropriate, other monomeric anions serve as counter-ions for the conductive polymer. Because of their small size, however, these are not bonded to the polymer in a sufficiently stable manner. As a result, diffusion of the counter-ions and therefore an increase in the equivalent series resistance (ESR) of the capacitor may occur, especially at elevated use temperatures of the capacitor. The alternative use of high molecular weight polymeric counter-ions in the chemical in situ polymerization does not lead to sufficiently conductive films and therefore does not lead to low ESR values.

In addition to the in situ polymerization described above, processes for the production of solid electrolytes in capacitors in which a dispersion comprising the already polymerized thiophene and a polyanion as a counter-ion, for example the PEDOT/PSS dispersions known from the prior art, is applied to the oxide layer and the dispersing agent is then removed by evaporation are also known from the prior art.

The disadvantage of the capacitors obtained by employing such dispersions, however, is inter alia that they have on the one hand a comparatively low capacitance and on the other hand unsatisfactory low temperature properties. "Low temperature properties" of a capacitor in this context are understood as meaning the influencing of the electrical characteristic values thereof, such as, for example, the capacitance, the equivalent series resistance, the breakdown voltage or the residual current, but in particular the influencing of the capacitance, at low temperatures, in particular at temperatures down to below −60° C.

SUMMARY

One aspect of the invention pertains to a process for the production of a capacitor, comprising the process steps:
a) the provision of an electrode body (1) of an electrode material (2), wherein a dielectric (3) covers one surface (4) of this electrode material (2) at least partly under formation of an anode body (5);
b) the introduction of a dispersion comprising a dispersing agent, a foreign-doped conductive polymer and counter-ions which are not covalently bonded to the foreign-doped conductive polymer into at least a part of the anode body (5);
c) the at least partial removal of the dispersing agent under obtaining a solid electrolyte (6) in a capacitor body; wherein a self-doped conductive polymer is additionally introduced into at least a part of the anode body (5).

Another aspect of the invention pertains to a capacitor obtainable by one or more of the processes described herein. Another aspect of the invention pertains to a capacitor comprising an electrode body (1) of an electrode material (2), wherein a dielectric (3) at least partly covers the surface (4) of this electrode material (2) and forms an anode body (5), wherein the anode body (5) is at least partly coated with a solid electrolyte (6) which comprises a foreign-doped conductive polymer, counter-ions which are not covalently bonded to the foreign-doped conductive polymer and a self-doped conductive polymer.

Another aspect of the invention relates to an electronic circuit comprising one or more of the capacitors described herein. Another aspect of the invention pertains to use of one or more of the capacitors described herein in electronic circuits.

Another aspect of the invention pertains to a dispersion comprising a self-doped conductive polymer, a foreign-doped conductive polymer and counter-ions which are not covalently bonded to the foreign-doped conductive polymer.

BRIEF DESCRIPTION OF THE FIGURE

The FIGURE shows a section though a part of a capacitor obtainable in accordance with one or more embodiments of the invention.

DETAILED DESCRIPTION

The present invention was based on the object of overcoming the disadvantages resulting from the prior art in connection with capacitors, in particular in connection with solid electrolytic capacitors, very particularly preferably in connection with the aluminium or tantalum capacitors known from the prior art.

In particular, the present invention was based on the object of providing a process for the production of a capacitor, by means of which, with the lowest possible technical outlay, capacitors which, in addition to an equivalent series resistance which is as low as possible, show both an adequate capacitance and adequate low temperature properties can be provided.

A contribution towards achieving the abovementioned objects is made in particular by a process for the production of a capacitor, comprising the process steps
a) the provision of an electrode body of an electrode material, wherein a dielectric covers one surface of this electrode material at least partly under formation of an anode body;
b) the introduction of a dispersion comprising a dispersing agent, a foreign-doped conductive polymer and counter-ions which are not covalently bonded to the foreign-doped conductive polymer into at least a part of the anode body;
c) the at least partial removal of the dispersing agent under obtaining a solid electrolyte in a capacitor body;
wherein a self-doped conductive polymer is additionally introduced into at least a part of the anode body.

In connection with the process according to the invention, it is preferable in particular for both the foreign-doped conductive polymer and the self-doped conductive polymer to be introduced as polymers into at least a part of the anode body, and in particular not to be prepared once inside the anode body by in situ polymerization.

In process step a), an electrode body of an electrode material, wherein a dielectric covers one surface of this electrode material at least partly under formation of an anode body, is first provided.

In principle, the electrode body can be produced by pressing a valve metal powder of high surface area and sintering it to give a usually porous electrode body. An electrical contact wire, preferably of a valve metal, such as e.g. tantalum, is conventionally also pressed into the electrode body here. The electrode body is then coated, for example by electrochemical oxidation, with a dielectric, i.e. an oxide layer. Alternatively, metal foils can also be etched, and coated with a dielectric by electrochemical oxidation in order to obtain an anode foil having a porous region. In a wound capacitor, an anode foil having a porous region, which forms the electrode body, and a cathode foil are separated by separators and wound up.

In the context of the invention, valve metal is to be understood as meaning those metals of which the oxide layers do not render possible current flow equally in both directions. In the case of an anodically applied voltage, the oxide layers of the valve metals block the current flow, while in the case of a cathodically applied voltage large currents occur, which may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best known representatives of the valve metals are Al, Ta and Nb. Compounds which have electrical properties comparable to a valve metal are those having metallic conductivity, which can be oxidized and of which the oxide layers have the properties described above. For example, NbO has metallic conductivity, but in general is not regarded as a valve metal. Layers of oxidized NbO have, however, the typical properties of valve metal oxide layers, so that NbO or an alloy or compound of NbO with other elements are typical examples of such compounds which have electrical properties comparable to a valve metal. Electrode materials of tantalum, aluminium and those electrode materials based on niobium or niobium oxide are preferred. Tantalum and aluminium are very particularly preferred as the electrode material.

For production of the electrode body, often with a porous region, the valve metals can be sintered, for example in powder form, to give a usually porous electrode body, or a porous structure is stamped on a metallic body. The latter can be carried out e.g. by etching a foil.

For simplicity, bodies having a porous region are also called porous in the following. Thus, for example, electrode bodies having a porous region are also called porous electrode bodies. On the one hand, the porous bodies can be permeated by a plurality of channels and therefore be sponge-like. This is often the case if tantalum is used for construction of the capacitor. Furthermore, it is possible for only the surface to have pores and for the region following under the surface pores to be non-porous in construction. Such a situation is often observed if aluminium is used for construction of the capacitor. Preferably, the electrode body is porous.

The often porous electrode bodies produced in this manner are then oxidized, for example, in a suitable electrolyte, such as e.g. phosphoric acid or an aqueous solution of ammonium adipate, by application of a voltage, in order to form the dielectric. The level of this forming voltage depends on the oxide layer thickness to be achieved or the later use voltage of the capacitor. Preferred forming voltages lie in a range of from 1 to 500 V, particularly preferably in a range of from 2 to 150 V, very particularly preferably in a range of from 3 to 60 V.

The as a rule porous electrode bodies employed preferably have a porosity of from 10 to 90%, preferably from 30 to 80%, particularly preferably from 50 to 80% and an average pore diameter of from 10 to 10,000 nm, preferably from 20 to 5,000 nm, particularly preferably from 50 to 3,000 nm.

According to a particular embodiment of the process according to the invention, the electrolytic capacitor to be produced is an aluminium wound capacitor. In this case, in process step a) a porous aluminium foil is formed anodically as the electrode material, an aluminium oxide coating forming as the dielectric. The aluminium foil (anode foil) obtained in this manner is then provided with a contact wire and wound up with a further, optionally porous aluminium foil (cathode foil) likewise provided with a contact wire, these two foils being spaced from one another by one or more separators, which e.g. are based on cellulose or, preferably, on synthetic papers. After being wound up, the anode bodies obtained in this way are fixed, for example by means of an adhesive tape. The separator or separators can be carbonized by heating in an oven. This manner of production of anode bodies for aluminium wound capacitors is adequately known from the prior art and is described, for example, in U.S. Pat. No. 7,497,879 B2.

According to further particular embodiments of the process according to the invention, the electrolytic capacitor to be produced is an aluminium stacked capacitor or a tantalum electrolytic capacitor ("tantalum elco"), in particular a tantalum electrolytic capacitor having a polymeric outer layer, such as is described in DE-A-10 2009 007 594.

In process step b) of the process according to the invention, a dispersion comprising a dispersing agent, a foreign-doped conductive polymer and counter-ions which are not covalently bonded to the foreign-doped conductive polymer is then introduced into at least a part of the anode body.

In the context of the present invention, a "foreign-doped conductive polymer" here is understood as meaning a conductive polymer which has positive charges along the polymer chain and in which these positive charges are at least partly compensated by negative charged counter-ions, wherein these negative charged counter-ions are not covalently bonded to the conductive polymer (but can be covalently bonded to other monomers or to polymers which differ from the conductive polymer).

In contrast to this, in the context of the present invention, a "self-doped conductive polymer" is understood as meaning a conductive polymer which has positive charges along the polymer chain and in which these positive charges are at least partly compensated by negative charged counter-ions which are covalently bonded to the conductive polymer.

The dispersion is introduced into the porous region by known processes, e.g. impregnation, dipping, pouring, dripping on, spraying, misting on, knife coating, brushing or printing, for example ink-jet, screen or tampon printing. Preferably, the introduction is carried out by dipping the anode body provided in process step a) into the dispersion and thus impregnating it with this dispersion. The dipping into or the impregnation with the dispersion is preferably carried out for a period in a range of from 1 second to 120 minutes, particularly preferably in a range of from 10 seconds to 60 minutes and most preferably in a range of from 30 seconds to 15 minutes. The introduction of the dispersion into the anode body can be facilitated, for example, by increased or reduced pressure, vibration, ultrasound or heat.

The introduction of the dispersion into the anode body can be carried out directly or using an adhesion promoter, for example a silane, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, and/or one or more other functional layers.

As a result of the introduction, the dispersion preferably covers the pores of the porous region with a layer rather less. Rather, the surfaces of the cavities of the pores are at least partly coated with the dispersion. The particles present in the dispersion thus not only form a layer covering the openings of the pores; at least parts, often also all regions of the surface of the pores are also covered with a layer of the particles of the dispersion.

The term "polymers" as used in the context of the present invention includes, in the context of the invention, all compounds with more than one identical or different recurring unit.

Here in particular, "conductive polymers" are understood as meaning the compound class of π-conjugated polymers which, by oxidation or reduction, in particular by oxidation, have an electrical conductivity. Preferably, conductive polymers are understood as meaning those π-conjugated polymers which, by oxidation, have an electrical conductivity of the order of at least 0.1 S cm$^{-1}$.

The foreign-doped conductive polymer in the dispersion is preferably a polythiophene, a polypyrrole or a polyaniline, but very particularly preferably a polythiophene.

In this connection, it is preferable in particular for the foreign-doped conductive polymer to be a polythiophene having recurring units of the general formula (i) or (ii) or a combination of units of the general formulae (i) and (ii), preferably a polythiophene having recurring units of the general formula (ii)

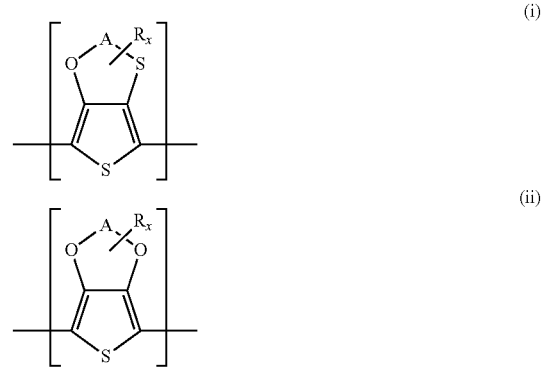

wherein
A represents an optionally substituted $C_1$-$C_5$-alkylene radical,
R represents a linear or branched, optionally substituted $C_1$-$C_{15}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8 and
in the case where several radicals R are bonded to A, these can be identical or different.

The general formulae (i) and (ii) are to be understood as meaning that x substituents R can be bonded to the alkylene radical A.

Polythiophenes having recurring units of the general formula (ii) wherein A represents an optionally substituted $C_2$-$C_3$-alkylene radical and x represents 0 or 1 are particularly preferred.

In the context of the invention, the prefix "poly" is to be understood as meaning that the polymer or polythiophene comprises more than one identical or different recurring units of the general formulae (i) and (ii). In addition to the recurring units of the general formulae (i) and/or (ii), the polythiophenes can optionally also comprise other recurring units, but it is preferable for at least 50%, particularly preferably at least 75% and most preferably at least 95% of all recurring units of the polythiophene to have the general formula (i) and/or (ii), preferably the general formula (ii).

The percentage figures stated above are intended here to express the numerical content of the units of the structural formula (i) and (ii) in the total number of monomer units in the foreign-doped conductive polymer. The polythiophenes comprise a total of n recurring units of the general formula (i) and/or (ii), preferably of the general formula (ii), wherein n is an integer from 2 to 2,000, preferably 2 to 100. The recurring units of the general formula (i) and/or (ii), preferably of the general formula (ii), can in each case be identical or different within a polythiophene. Polythiophenes having in each case identical recurring units of the general formula (ii) are preferred.

According to a very particular embodiment of the process according to the invention, at least 50%, particularly preferably at least 75%, still more preferably at least 95% and most preferably 100% of all the recurring units of the polythiophene are 3,4-ethylenedioxythiophene units (i.e. the most preferred foreign-doped conductive polymer is poly(3, 4-ethylenedioxythiophene)).

The polythiophenes preferably in each case carry H on the end groups.

In the context of the invention, $C_1$-$C_5$-alkylene radicals A are preferably methylene, ethylene, n-propylene, n-butylene or n-pentylene. $C_1$-$C_{18}$-alkyl radicals R preferably represent linear or branched $C_1$-$C_{18}$-alkyl radicals, such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R represent, for example, cyclopentyl, cyclohexyl, cycloheptyl, cyclooctyl, cyclononyl or cyclodecyl, $C_5$-$C_{14}$-aryl radicals R represent, for example, phenyl or naphthyl, and $C_7$-$C_{18}$-aralkyl radicals R represent, for example, benzyl, o-, m-, p-tolyl, 2,3-, 2,4-, 2,5-, 2,6-, 3,4-, 3,5-xylyl or mesityl. The preceding list serves to illustrate the invention by way of example and is not to be considered conclusive.

In the context of the invention, numerous organic groups comprising no anions are possible as optional further substituents of the radicals A and/or of the radicals R, for example alkyl, cycloalkyl, aryl, aralkyl, alkoxy, halogen, ether, thioether, disulphide, sulphoxide, sulphone, amino, aldehyde, keto, carboxylic acid ester, alkylsilane and alkoxysilane groups and carboxamide groups.

The foreign-doped conductive polymers are preferably cationic, "cationic" relating only to the charges on the polythiophene main chain. The positive charges are not shown in the formulae, since their precise number and position cannot be determined absolutely. However, the number of positive charges is at least 1 and at most n, where n is the total number of all recurring units (identical or different) within the polythiophene.

To compensate the positive charge, the cationic polythiophenes require anions as counter-ions, it being possible for the counter-ions to be monomeric or polymeric anions. According to the invention, these counter-ions are contained in the dispersion employed in process step b) and are not covalently bonded to the foreign-doped conductive polymer.

According to a particular embodiment of the process according to the invention, the counter-ions contained in the dispersion are present as polymeric anions. Polymeric anions are also called polyanions in the following. In the case where polyanions are employed, it is particularly preferable for the dispersion to comprise ionic complexes of polythiophenes (as the foreign-doped conductive polymer) and polyanions (as the counter-ion), very particularly preferably ionic complexes of poly(3,4-ethylenedioxythiophene) and polystyrenesulphonic acid (so-called PEDOT/PSS complexes).

Polyanions are preferable to monomeric anions as counter-ions, since they contribute towards film formation and because of their size lead to electrically conductive films which are more stable to heat. Polyanions here can be, for example, anions of polymeric carboxylic acids, such as polyacrylic acids, polymethacrylic acid or polymaleic acids, or of polymeric sulphonic acids, such as polystyrenesulphonic acids and polyvinylsulphonic acids. These polycarboxylic and -sulphonic acids can also be copolymers of vinylcarboxylic and vinylsulphonic acids with other polymerizable monomers, such as acrylic acid esters and styrene. Particularly preferably, the solid electrolyte comprises an anion of a polymeric carboxylic or sulphonic acid for compensation of the positive charge of the polythiophene.

The anion of polystyrenesulphonic acid (PSS), which, if a polythiophene is used, in particular poly(3,4-ethylenedioxythiophene), is preferably present bonded as a complex in the form of the PEDOT/PSS ionic complexes known from the prior art, is particularly preferred as the polyanion. Such ionic complexes are obtainable by polymerizing the thiophene monomers, preferably 3,4-ethylenedioxythiophene, oxidatively in aqueous solution in the presence of polystyrenesulphonic acid. Details of this are to be found, for example, in chapter 9.1.3 in *"PEDOT•Principles and Applications of an Intrinsically Conductive Polymer"*, Elschner et al., CRC Press (2011).

The molecular weight of the polyacids which supply the polyanions is preferably 1,000 to 2,000,000, particularly preferably 2,000 to 500,000. The polyacids or their alkali metal salts are commercially obtainable, e.g. polystyrenesulphonic acids and polyacrylic acids, or can be prepared by known processes (see e.g. Houben Weyl, Methoden der organischen Chemie, vol. E 20 Makromolekulare Stoffe, part 2, (1987), p. 1141 et seq.).

Polyanions and polythiophenes, in particular polystyrenesulphonic acid and poly(3,4-ethylenedioxythiophene) can be present in the dispersion and also in the solid electrolyte in a weight ratio of from 0.5:1 to 50:1, preferably from 1:1 to 30:1, particularly preferably 2:1 to 20:1. The weight of the conductive polymers here corresponds to the weight of the monomers employed for the preparation of the conductive polymers, assuming that complete conversion takes place during the polymerization. According to a particular embodiment of the capacitor according to the invention, the polystyrenesulphonic acid is present in an excess by weight compared with the foreign-doped polythiophene, in particular compared with poly(3,4-ethylenedioxythiophene).

Monomeric anions which are used are, for example, those of $C_1$-$C_{20}$-alkanesulphonic acids, such as methane-, ethane-, propane-, butanesulphonic acid or higher sulphonic acids, such as dodecanesulphonic acid, of aliphatic perfluorosulphonic acids, such as trifluoromethanesulphonic acid, perfluorobutanesulphonic acid or perfluorooctanesulphonic acid, of aliphatic $C_1$-$C_{20}$-carboxylic acids, such as 2-ethylhexylcarboxylic acid, of aliphatic perfluorocarboxylic acids, such as trifluoroacetic acid or perfluorooctanoic acid, and of aromatic sulphonic acids optionally substituted by $C_1$-$C_{20}$-alkyl groups, such as benzenesulphonic acid, o-toluenesulphonic acid, p-toluenesulphonic acid or dodecylbenzenesulphonic acid, and of cycloalkanesulphonic acids, such as camphorsulphonic acid, or tetrafluoroborates, hexafluorophosphates, perchlorates, hexafluoroantimonates, hexafluoroarsenates or hexachloroantimonates.

The anions of p-toluenesulphonic acid, methanesulphonic acid or camphorsulphonic acid are preferred as monomeric anions.

The ionic complexes of foreign-doped conductive polymer and the counter-ions, preferably the polyanions, in particular the PEDOT/PSS ionic complexes, are present in the dispersion preferably in the form of particles. These particles in the dispersion preferably have a specific electrical conductivity of greater than 50 S/cm. In this context, the specific electrical conductivity of the particles is the specific electrical conductivity of the film in the dry state which forms from the particles on drying of the dispersion. Preferably, dispersions in which the particles have a specific electrical conductivity of greater than 100 S/cm, particularly preferably greater than 300 S/cm, where appropriate even greater than 500 S/cm, are employed. In some cases particles having a specific conductivity of a maximum of 5,000 S/cm are also employed.

According to the invention, the particles in the dispersion employed in process step b) preferably have a diameter $d_{50}$ in a range of from 1 to 100 nm, preferably in a range of from 1 to 60 nm and particularly preferably in a range of from 5 to 40 nm. The $d_{50}$ value of the diameter distribution says in this context that 50% of the total weight of all the particles in the dispersion can be assigned to those particles which have a diameter of less than or equal to the $d_{50}$ value. The diameter of the particles is determined via an ultracentrifuge measurement. The general procedure is described in Colloid Polym. Sci. 267, 1113-1116 (1989).

The dispersion employed in process step b) preferably has a purity of metals and transition metals as described in WO 2010/003874 A2 on page 6, lines 10-29. The low concentrations of metals in the dispersions have the great advantage that the dielectric is not damaged during formation of the solid electrolyte and in later operation of the capacitor.

The dispersion employed in process step b) comprises one or more dispersing agents in addition to the foreign-doped conductive polymer and the counter-ion, preferred dispersing agents being water, organic solvents or mixtures of organic solvent and water. Dispersing agents which may be mentioned are, for example, the following solvents: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulphoxides and sulphones, such as dimethylsulphoxide and sulpholane; aliphatic carboxylic acid amides, such as methylacetamide, dimethylacetamide and dimethylformamide; aliphatic and araliphatic ethers, such as diethyl ether and anisole. Water or a mixture of water with the abovementioned organic solvents can furthermore also be used as a dispersing agent.

Preferred dispersing agents are water or other protic solvents, such as alcohols, e.g. methanol, ethanol, i-propanol and butanol, and mixtures of water with these alcohols, water being the particularly preferred dispersing agent.

The dispersion employed in process step b) can moreover comprise further additives in addition to the foreign-doped conductive polymer, the counter-ions and the dispersing agent, such as surface-active substances, e.g. anionic surfactants, such as e.g. alkylbenzenesulphonic acids and salts, paraffinsulphonates, alcohol sulphonates ether sulphonates, sulphosuccinates, phosphate esters, alkyl ether carboxylic acids or carboxylates, cationic surfactants, such as e.g. quaternary alkylammonium salts, nonionic surfactants, such as e.g. linear alcohol ethoxylates, oxo alcohol ethoxylates, alkylphenol ethoxylates or alkyl polyglucosides, or adhesion promoters, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, crosslinking agents, such as melamine compounds, masked isocyanates, functional silanes—e.g. tetraethoxysilane, alkoxysilane hydrolysates, e.g. based on tetraethoxysilane, epoxysilanes, such as 3-glycidoxypropyltrialkoxysilane—polyurethanes, polyacrylates or polyolefin dispersions.

Preferably, the dispersions employed in process step b) comprise further additives which, for example, increase the conductivity, such as e.g. compounds containing ether groups, such as e.g. tetrahydrofuran, compounds containing lactone groups, such as γ-butyrolactone, γ-valerolactone, compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as e.g. sulpholane (tetramethylene sulphone), dimethylsulphoxide (DMSO), sugars or sugar derivatives, such as e.g. sucrose, glucose, fructose, lactose, sugar alcohols, such as e.g. sorbitol, mannitol, furan derivatives, such as e.g. 2-furancarboxylic acid, 3-furancarboxylic acid, glycerol, diglycerol, triglycerol or tetraglycerol.

The dispersion can also comprise as additives alkylene glycols, dialkylene glycols, trialkylene glycols, polyalkylene glycols from more than three alkylene units, polyglycerols or mixtures of at least two of these compounds. In this connection it is particularly preferable for the dispersion to comprise at least an alkylene glycol, a polyalkylene glycol, a polyglycerol or a mixture of at least two of these additives.

Ethylene glycol and propylene glycol are preferred in particular as the alkylene glycol. Preferred dialkylene glycols, trialkylene glycols or polyalkylene glycols are in particular those based on ethylene glycols and propylene glycols or random copolymers of the two. Diethylene glycol, dipropylene glycol, triethylene glycol, tripropylene glycol, polyethylene glycol or polypropylene glycol are preferred in particular. The polyalkylene glycols can also be branched. The polyalkylene glycols can furthermore be unsubstituted on the end groups, i.e. carry two free hydroxyl groups, or functionalized, preferably etherified, once or twice on the end groups. The polyalkylene glycol or polyalkylene glycol derivative preferably has a molecular weight, determined by gel permeation chromatography, in a range of from 100 to 100,000 g/mol, particularly preferably in a range of from 200 to 50,000 g/mol and most preferably in a range of from 200 to 5,000 g/mol. Polyethylene glycols are particularly preferred as the polyalkylene glycols. Possible compounds are, in particular, the polyethylene glycols known under the names "PEG 300", "PEG 400", "PEG 600", "PEG 1000", "PEG 2000" or "PEG 4000". "PEG 400" and "PEG 600" are particularly preferred.

Preferred polyglycerols which can be employed as additives are those polyglycerols which are disclosed in DE-A-10 2011 013 068. Polyglycerols which comprise diglycerol, triglycerol, tetraglycerol, pentaglycerol, hexaglycerol and optionally oligomers of more than six glycerol units are preferred in particular. Such polyglycerols are obtainable, for example, from SOLVAY CHEMICALS GmbH, Rheinberg, Germany under the names "Polyglycerol-3" (contains about 29 wt. % of diglycerol, about 42 wt. % of triglycerol, about 19 wt. % of tetraglycerol, about 6 wt. % of pentaglycerol and about 4 wt. % of polyglycerols of six or more glycerol units) or "Polyglycerol-4" (contains about 2 wt. % of diglycerol, about 40 wt. % of triglycerol, about 35 wt. % of tetraglycerol, about 20 wt. % of pentaglycerol and about 8 wt. % of polyglycerols of six or more glycerol units).

If alkylene glycols, polyalkylene glycols and/or polyglycerols are used in particular as additives, these substances can also be introduced into at least a part of the anode body only after the introduction of the dispersion into at least a part of the anode body in process step b) and the at least partial removal of the dispersing agent. This can be realized, for example, by impregnating the anode body with a solution or dispersion comprising the alkylene glycols, the polyalkylene glycols and/or the polyglycerols.

In this connection it is furthermore preferable for the dispersion employed in process step b) to comprise the alkylene glycol, the polyalkylene glycol, the polyglycerol or the mixture of at least two of these in an amount in a range of from 0.1 to 40 wt. %, particularly preferably in a range of from 1 to 30 wt. % and most preferably from 2 to 20 wt. %, in each case based on the total weight of the dispersion employed in process step b).

The dispersions employed in process step b) can moreover comprise as an additive one or more organic binders which are soluble in organic solvents, as described in WO 2009/141209 A1 on page 12, lines 16-34. The dispersions can have a pH of from 1 to 14, and a pH of from 1 to 8 is preferred. For corrosion-sensitive dielectrics, such as, for example, aluminium oxides or niobium oxides, dispersions having a pH of from 2.5 to 8 are preferred, in order not to damage the dielectric.

To adjust the pH, for example, bases or acids, as described in WO 2010/003874 A2 on page 4, lines 13-32, can be added as additives to the dispersions employed in process step b). Those additions which do not impair the film formation of the dispersions and are not volatile at higher temperatures, e.g. soldering temperatures, but remain in the solid electrolyte under these conditions, such as e.g. the bases 2-dimethylaminoethanol, 2,2'-iminodiethanol or 2,2',2''-nitrilotriethanol and the acid polystyrenesulphonic acid, are preferred.

The viscosity of the dispersion employed in process step b) can be between 0.1 and 1,000 mPa·s (measured with a rheometer at 20° C. and a shear rate of 100 s$^{-1}$), depending on the method of application. Preferably, the viscosity is 1 to 500 mPa·s, particularly preferably between 5 to 250 mPa·s. In the case of the production of aluminium wound capacitors the viscosity is very particularly preferably in a range of from 40 to 200 mPa·s, while in the production of tantalum electrolytic capacitors or aluminium stacked capacitors it is very particularly preferably in a range of from 5 to 50 mPa·s.

The solids content of the dispersion employed in process step b) is preferably in a range of from 0.01 to 20 wt. %, particularly preferably in a range of from 0.1 to 10 wt. % and most preferably in a range of from 0.25 to 5 wt. %, in each case based on the total weight of the dispersion. The solids content of PEDOT/PSS (without additives) is determined via drying of the dispersion at a temperature which is sufficiently high to remove the dispersing agent, but without thereby decomposing the solid.

After the anode bodies have been impregnated with the dispersion described above, in process step c) the dispersing agent contained in the dispersion is at least partly removed or hardened, so that a solid electrolyte which completely or partly covers the dielectric, and therefore a capacitor body is formed. In this context it is preferable for the covering of the dielectric by the solid electrolyte to be preferably at least 50%, particularly preferably at least 70% and most preferably at least 80%, it being possible for the covering to be determined by measurement of the capacitance of the capacitor in the dry and in the damp state at 120 Hz, as is described in DE-A-10 2005 043 828.

The removal or hardening is preferably carried out by removing the electrode body from the dispersion and drying it, the drying preferably being carried out at a temperature in a range of from 20° C. to 260° C., particularly preferably in a range of from 50° C. to 220° C. and most preferably in a range of from 80° C. to 200° C. Process steps b) and c) can also be repeated once or several times, in order in this manner to adapt the thickness of the layer of the solid electrolyte deposited on the dielectric or the degree of filling of the electrolyte in the electrode body to the particular requirements.

The process according to the invention is now characterized in that in addition to the foreign-doped conductive polymer, a self-doped conductive polymer is additionally also introduced into at least a part of the anode body, it being possible for the foreign-doped conductive polymer (contained in the dispersion introduced in process step b)) and the self-doped conductive polymer in principle each also to be introduced several times into at least a part of the anode body and it being possible here in particular for the sequence in which these polymers can be introduced to be as desired. Thus, in particular, the self-doped conductive polymer can be introduced into at least a part of the anode body I) in part or also completely before the introduction of the dispersion in process step b), II) in part or also completely after the introduction of the dispersion in process step b) and before process step c) is carried out, III) in part or also completely after the introduction of the dispersion in process step b) and after process step c) is carried out, IV) in part or also completely together with the dispersion in process step b) as a further constituent contained in the dispersion.

The above process variants I) to IV) in this context, in particular in the cases in which the foreign-doped conductive polymer and/or the self-doped conductive polymer are introduced into at least a part of the anode body, can be combined with one another as desired.

According to a first particular embodiment of the process according to the invention, the self-doped conductive polymer is introduced into at least a part of the anode body in the form of a solution or dispersion (comprising the self-doped conductive polymer and a solvent or dispersing agent), preferably in the form of a solution, before the dispersion is introduced into at least a part of the anode body according to process step b). In this context, both the introduction of the solution or dispersion comprising the self-doped conductive polymer and the introduction of the dispersion comprising the foreign-doped conductive polymer, in each case followed by a drying step according to process step c) (for removal of solvent or dispersing agent), can be carried out once or several times, for example 1 to 40 times or 1 to 20 times.

According to a second particular embodiment of the process according to the invention, the self-doped conductive polymer is introduced into at least a part of the anode body in the form of a solution or dispersion (comprising the self-doped conductive polymer and a solvent or dispersing agent), preferably in the form of a solution, after the dispersion is introduced into at least a part of the anode body according to process step b), it being possible here for the solution or dispersion comprising the self-doped conductive polymer to be introduced before or after process step c), but it preferably being introduced after process step c). In this embodiment of the process according to the invention also, both the introduction of the solution or dispersion comprising the self-doped conductive polymer and the introduction of the dispersion comprising the foreign-doped conductive polymer, in each case followed by a drying step according to process step c) (for removal of solvent or dispersing agent), can be carried out once or several times, for example 1 to 40 times or 1 to 20 times.

If both the self-doped conductive polymer and the foreign-doped conductive polymer are introduced into at least a part of the anode body in the form of solutions or dispersions several times, for example by impregnation, these polymers can also be introduced in alternation (that is to say e.g. 1st impregnation: introduction of a solution or dispersion comprising the self-doped conductive polymer and optionally drying according to process step c) for removal of the solvent or dispersing agent; 2nd impregnation: introduction of a dispersion comprising the foreign-doped conductive polymer and optionally drying according to process step c) for removal of the dispersing agent; 3rd impregnation: introduction of a solution or dispersion comprising the self-doped conductive polymer and optionally drying according to process step c) for removal of the solvent or dispersing agent; 4th impregnation: introduction of a dispersion comprising the foreign-doped conductive polymer and optionally drying according to process step c) for removal of the dispersing agent; etc), it also being possible for sequences other than the abovementioned sequence to be chosen. x impregnations with a solution or dispersion comprising the self-doped conductive polymer (where x=1 to 40, preferably 1 to 20), in each case followed by a drying according to process step c), followed by y impregnations with a dispersion comprising a foreign-doped conductive polymer (where y=1 to 40, preferably 1 to 20), in each case followed by a drying according to process step c), for example, are also conceivable.

Both in the first and in the second particular embodiment of the process according to the invention, the self-doped polymer and the foreign-doped polymer are introduced separately from one another, so that, depending on the process conditions, where appropriate a solid electrolyte layer in which layers A comprising a self-doped conductive polymer and layers B comprising a foreign-doped conductive polymer and the counter-ions, in particular layers comprising PEDOT/PSS, are present side by side is obtained. All layer sequences are possible here, such as, for example:
ABBBBB . . .
BAAAAA . . .
ABABAB . . .
BABABA . . .
ABB . . . BBA
BAA . . . AAB
AAA . . . BBB
BBB . . . AAA.

The first and the second particular embodiment of the process according to the invention in which a solution or dispersion comprising the self-doped conductive polymer is introduced at least once into at least a part of the anode body separately from a dispersion comprising the foreign-doped conductive polymer has proved to be advantageous in particular if the capacitor is a tantalum electrolytic capacitor or an aluminium stacked capacitor.

According to a third particular embodiment of the process according to the invention, the self-doped conductive polymer is introduced into at least a part of the anode body together with the foreign-doped conductive polymer, in that either the self-doped conductive polymer is contained in the dispersion comprising the foreign-doped conductive polymer and the counter-ions (and consequently is employed in the form of the dispersion according to the invention still to be described in the following), or in that the self-doped conductive polymer is introduced into at least a part of the anode body in the form of an independent solution or dispersion together with the dispersion comprising the foreign-doped conductive polymer and the counter-ions, and the solvent or dispersing agent is then removed by process step c). In the case also in which the self-doped conductive polymer is introduced into at least a part of the anode body together with the foreign-doped conductive polymer, these two components, in particular the dispersion according to the invention still to be described in the following, can be introduced once or several times, for example 1 to 40 times or 1 to 20 times, each introduction preferably in each case being followed by a process step c) for removal of solvents or dispersing agents.

In contrast to the first and second particular embodiment of the process according to the invention, in the third particular embodiment of the process according to the invention the self-doped polymer and the foreign-doped polymer are introduced together and preferably in the form of the dispersion according to the invention still to be described in the following, so that a solid electrolyte layer in which the self-doped conductive polymer, the foreign-doped conductive polymer and the counter-ions, in particular the self-doped conductive polymer and PEDOT/PSS, are present in one or more layers together and in homogeneous distribution within the solid electrolyte layer is obtained.

The three particular embodiments of the process according to the invention which are described above can also be combined with one another.

Thus, in particular in connection with tantalum electrolytic capacitors, it has proved to be particularly advantageous if
the self-doped conductive polymer is first introduced (for example by 1 to 10 impregnations, particularly preferably by 1 to 5 impregnations and most preferably by one impregnation) into at least a part of the anode body either by itself in a solution or dispersion (comprising the self-doped conductive polymer and a solvent or dispersing agent) or together with the foreign-doped conductive polymer, for example in the form of a joint solution or dispersion (comprising the self-doped conductive polymer, the foreign-doped conductive polymer, the counter-ions and a solvent or dispersing agent), and
the foreign-doped conductive polymer is then introduced (for example by 1 to 20 impregnations, particularly preferably by 1 to 10 impregnations) into at least a part of the anode body in a solution or dispersion (comprising the foreign-doped conductive polymer, the counter-ions and a solvent or dispersing agent).

In connection with aluminium wound capacitors, it has proved to be particularly advantageous if
the self-doped conductive polymer is introduced (for example by 1 to 20 impregnations, particularly preferably by 1 to 10 impregnations and most preferably by one impregnation) into at least a part of the anode body together with the foreign-doped conductive polymer, for example in the form of a joint solution or dispersion (comprising the self-doped conductive polymer, the foreign-doped conductive polymer, the counter-ions and a solvent or dispersing agent), or the self-doped conductive polymer is first introduced (for example by 1 to 20 impregnations, particularly preferably by 1 to 10 impregnations and most preferably by one impregnation) into at least a part of the anode body together with the foreign-doped conductive polymer, for example in the form of a joint solution or dispersion (comprising the self-doped conductive polymer, the foreign-doped conductive polymer, the counter-ions and a solvent or dispersing agent), and the foreign-doped conductive polymer is then introduced (for example by 1 to 20 impregnations, particularly preferably by 1 to 10 impregnations) into at least a part of the anode body in a solution or dispersion (comprising the foreign-doped conductive polymer, the counter-ions and a solvent or dispersing agent).

Those conductive polymers which are described in EP 1 122 274 A1 are preferred in particular as the self-doped conductive polymer. Preferably, these self-doped conductive polymers comprise, to the extent of at least 50%, still more preferably to the extent of at least 75%, still more preferably to the extent of at least 95% and most preferably to the extent of 100%, recurring units of the formula (I)

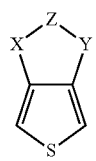

(I)

in which
X, Y are identical or different and denote O, S, N—$R^1$,
Z denotes —$(CH_2)_m$—$CR^2R^3$—$(CH_2)_n$—,
$R^1$ denotes aryl, $C_1$-$C_{18}$-alkyl or hydrogen,
$R^2$ denotes hydrogen or —$(CH_2)_s$—O—$(CH_2)_p$—$SO_3^-M^+$,
$R^3$ denotes —$(CH_2)_s$—O—$(CH_2)_p$—$SO_3^-M^+$,
$M^+$ denotes a cation,
m, n are identical or different and denote an integer from 0 to 3,
s denotes an integer from 0 to 10 and
p denotes an integer from 1 to 18.

The percentage figures stated above are intended in this context to express the numerical content of the units of the structural formula (I) in the total number of monomer units in the self-doped conductive polymer.

Suitable cations $M^+$ are e.g. $H^+$, $Li^+$, $Na^+$, $K^+$, $Rb^+$, $Cs^+$ and $NH_4^+$. Particularly suitable cations are $Na^+$ and $K^+$.

Particularly preferred monomers of the structural formula (I) are those in which
X, Y denote O,
Z denotes —$(CH_2)_m$—$CR^2R^3$—$(CH_2)_n$—,
$R^2$ denotes hydrogen or —$(CH_2)_s$—O—$(CH_2)_p$—$SO_3^-M^+$,
$R^3$ denotes —$(CH_2)_s$—O—$(CH_2)_p$—$SO_3^-M^+$,
$M^+$ denotes a cation,
m, n are identical or different and denote an integer from 0 to 3,
s denotes an integer from 0 to 10 and
p denotes an integer from 1 to 18.

Very particularly preferred monomers of the structural formula (I) are those in which
X, Y denote O,
Z denotes —$(CH_2)$—$CR^2R^3$—$(CH_2)_n$—,
$R^2$ denotes hydrogen,
$R^3$ denotes —$(CH_2)_s$—O—$(CH_2)_p$—$SO_3^-M^+$,
$M^+$ denotes $Na^+$ or $K^+$,
n denotes 0 or 1,
s denotes 0 or 1 and
p denotes 3, 4 or 5.

The monomeric compounds are known. Their preparation is described in Chevrot et al., *J. Electroanal. Chem.* 1998, 443, 217-226, Leclerc et al., *Adv. Mater.* 1997, 9, 1087-1094 and Reynolds et al., *Polymer Preprints* 1997, 38 (2), 320. The preparation of the self-doped conductive polymers by oxidative polymerization can be carried out with suitable oxidizing agents in water, as is described, for example, in EP 1 122 274 A1.

Concrete examples of very particularly preferred self-doped conductive polymers include poly(4-(2,3-dihydrothieno-[3,4-b][1,4]dioxin-2-ylmethoxy)-1-butanesulphonic acid) and poly(4-(2,3-dihydrothieno-[3,4-b][1,4]dioxin-2-ylmethoxy)-1-propanesulphonic acid).

If the self-doped conductive polymer is not employed together with the foreign-doped conductive polymer in the form of the dispersion according to the invention in the process according to the invention, the introduction of the self-doped conductive polymer into at least a part of the anode body is preferably carried out by introduction of a solution or dispersion of the self-doped conductive polymer, preferably a solution, into the anode body. Suitable solvents and dispersing agents in this connection are water, aliphatic alcohols, such as methanol, ethanol, isopropanol, butanol, diacetone alcohol, ethylene glycol or glycerol, aliphatic ketones, such as acetone and methyl ethyl ketone, and aliphatic nitriles, such as acetonitrile. According to the invention, it is particularly preferable in this connection for the self-doped conductive polymer to be employed in the form of an aqueous solution.

The concentration of self-doped conductive polymer in the solution or dispersion, in particular also in the dispersion according to the invention, is preferably in a range of from 0.1 to 30 wt. %, still more preferably in a range of from 0.2 to 20 wt. % and most preferably in a range of from 0.5 to 10 wt. %, in each case based on the total weight of the solution or of the dispersion.

In connection with the process according to the invention, it is furthermore preferable for the self-doped conductive polymer to be introduced into at least a part of the anode body in an amount such that the weight ratio of self-doped conductive polymer to foreign-doped conductive polymer in the solid electrolyte is in a range of from 100:1 to 1:100, particularly preferably in a range of from 50:1 to 1:50, still more preferably in a range of from 10:1 to 1:10 (this range has proved to be advantageous in particular for tantalum electrolytic capacitors) and most preferably in a range of from 10:1 to 1:2. This weight ratio means the weight ratio which is present in the solid electrolyte after the production, in particular after the last impregnation with solutions or dispersions comprising the self-doped conductive polymer and/or the foreign-doped conductive polymer.

After the capacitor bodies have been produced in this manner, they can be further modified in the manner known to the person skilled in the art. In the case of a tantalum electrolytic capacitor, the capacitor bodies can be covered, for example, with a polymeric outer layer, as is described in DE-A-10 2004 022674 or DE-A-10 2009 007 594, and/or a graphite layer and a silver layer, as is known from DE-A-10 2005 043 828, while in the case of an aluminium wound capacitor, in accordance with the teaching of U.S. Pat. No. 7,497,879 B2, the capacitor body is incorporated into an aluminium beaker, provided with a sealing inspection plate and firmly closed mechanically by crimping. The capacitor can then be freed from defects in the dielectric in a known manner by ageing.

A contribution towards achieving the abovementioned objects is also made by a capacitor which is obtainable, preferably has been obtained, by the process according to the invention. Preferably, this capacitor is a tantalum electrolytic capacitor or an aluminium capacitor, for example an aluminium stacked capacitor or an aluminium wound capacitor.

A contribution towards achieving the abovementioned objects is also made by a capacitor comprising an electrode body of an electrode material, wherein a dielectric at least partly covers the surface of this electrode material and forms an anode body, wherein the anode body is at least partly coated with a solid electrolyte which comprises a foreign-doped conductive polymer, counter-ions which are not covalently bonded to the foreign-doped conductive polymer and a self-doped conductive polymer.

Such a capacitor is obtainable, for example, by the process according to the invention described above. In this context, the preferred self-doped conductive polymers, foreign-doped conductive polymer and counter-ions which are not covalently bonded to the foreign-doped conductive polymer are those polymers or counter-ions which have already been mentioned above in connection with the process according to the invention as the preferred self-doped conductive polymers, foreign-doped conductive polymer and counter-ions which are not covalently bonded to the foreign-doped conductive polymer.

According to a preferred embodiment of the capacitor according to the invention, the weight ratio of self-doped conductive polymer to foreign-doped conductive polymer in the solid electrolyte is in a range of from 100:1 to 1:100, particularly preferably in a range of from 50:1 to 1:50, still more preferably in a range of from 10:1 to 1:10 (this range has proved to be advantageous in particular for tantalum electrolytic capacitors) and most preferably in a range of from 10:1 to 1:2.

A further contribution towards achieving the abovementioned objects is also made by an electronic circuit comprising a capacitor obtainable by the process according to the invention or a capacitor according to the invention. In this connection there are to be mentioned, for example, electronic circuits such as can be found, for example, in computers (desktop, laptop, server), in computer peripherals (e.g. PC cards), in portable electronic equipment, such as e.g. mobile telephones, digital cameras or electronic entertainment systems, in devices for electronic entertainment systems, such as e.g. in CD/DVD players and computer games consoles, in navigation systems, in telecommunications installations, in domestic appliances, in medical technology, e.g. for defibrillators. According to the invention, the capacitors can also be employed in electronic circuits in hybrid or electric propulsion means for an automobile. The capacitors can serve in particular as intermediate capacitors (DC link capacitors) here.

A contribution towards achieving the abovementioned objects is also made by the use of a capacitor obtainable by the process according to the invention or of a capacitor according to the invention in electronic circuits, for example as an intermediate capacitor in an electronic circuit in hybrid or electric propulsion means for an automobile.

A contribution towards achieving the abovementioned objects is also made by a dispersion comprising a self-doped conductive polymer, a foreign-doped conductive polymer and counter-ions which are not covalently bonded to the foreign-doped conductive polymer. In this context, the preferred self-doped conductive polymers, foreign-doped conductive polymer and counter-ions which are not covalently bonded to the foreign-doped conductive polymer are in turn those polymers or counter-ions which have already been mentioned above in connection with the process according to the invention as the preferred self-doped conductive polymers, foreign-doped conductive polymer and counter-ions which are not covalently bonded to the foreign-doped conductive polymer.

According to a preferred embodiment of the dispersion according to the invention, this comprises (the wt. % data are in each case to be related to the total weight of the dispersion):

($\alpha$1) 0.1 to 30 wt. %, particularly preferably 0.2 to 20 wt. % and most preferably 0.5 to 10 wt. % of the self-doped conductive polymer, in particular PEDOT-S (polymer of 4-(2,3-dihydrothieno-[3,4-b][1,4]dioxin-2-ylmethoxy)-1-butanesulphonic acid);

($\alpha$2) 0.01 to 15 wt. %, particularly preferably 0.5 to 10 wt. % and most preferably 0.1 to 5 wt. % of the foreign-doped conductive polymer, in particular PEDOT;

($\alpha$3) 0.01 to 60 wt. %, particularly preferably 0.05 to 40 wt. % and most preferably 0.1 to 20 wt. % of the counter-ions which are not covalently bonded to the foreign-doped conductive polymer, in particular PSS;

($\alpha$4) 0.5 to 60 wt. %, particularly preferably 1 to 40 wt. % and most preferably 5 to 20 wt. % of at least one additive which differs from components ($\alpha$1) to ($\alpha$3) and ($\alpha$5), very particularly preferably an alkylene glycol; and ($\alpha$5) a dispersing agent, preferably water, in an amount such that the sum of components ($\alpha$1) to ($\alpha$5) is 100 wt. %.

The invention is now explained in more detail with the aid of non-limiting FIGURES and examples.

The FIGURE is a diagram of a section through a part of a capacitor obtainable by the process according to the invention. This has an electrode body 1, usually made of a porous electrode material 2, such as aluminium. On the surface 4 of the electrode material 2, a dielectric 3 is formed as a thin layer, so that an anode body 5 which is still porous and comprises the electrode body 1 of the electrode material 2 and the dielectric 3 is formed. The dielectric 3 is followed, optionally after further layers, by a layer of a solid electrolyte 6 (e.g. comprising PEDOT/PSS particles and a self-doped conductive polymer), whereby a capacitor body 7, comprising the electrode body 1 of the electrode material 2, the dielectric 3 and the solid electrolyte 6, is formed.

Measurement Methods

Equivalent Series Resistance

The equivalent series resistance (in m$\Omega$) was determined at 20° C. at 100 kHz by means of an LCR meter (Agilent 4284A).

Capacitance

The capacitance (in µF) was determined at 20° C. at 120 Hz by means of an LCR meter (Agilent 4284A).

EXAMPLES

Preparation Example 1 (Preparation of a PEDOT/PSS Dispersion)

868 g of deionized water and 330 g of an aqueous polystyrenesulphonic acid solution having an average molecular weight of 70,000 g/mol and a solids content of 3.8 wt. % were initially introduced into a 2 l three-necked flask with a stirrer and internal thermometer. The reaction temperature was kept between 20 and 25° C. 5.1 g of 3,4-ethylenedioxythiophene were added, while stirring. The solution was stirred for 30 min. 0.03 g of iron(III) sulphate and 9.5 g of sodium persulphate were then added and the solution was stirred for a further 24 h. After the reaction had ended, for removal of inorganic salts 100 ml of a strongly acid cation exchanger and 250 ml of a weakly basic anion exchanger were added and the solution was stirred for a further 2 h. The ion exchanger was filtered off. The poly(3,4-ethylenedioxythiophene)/polystyrenesulphonate dispersion was homogenized with a high pressure homogenizer ten times under a pressure of 700 bar. The dispersion was subsequently concentrated to a solids content of 2.5% and then additionally homogenized another five times under a pressure of 1,500 bar.

Preparation Example 2 (Adjustment of the Solids Content and pH)

The dispersion from Preparation Example 1 was diluted to a concentration of 2.2% by addition of deionized water and then adjusted to a pH of 3 with aqueous ammonia.

Preparation Example 3 (Preparation of a PEDOT-S Solution)

For the preparation of a PEDOT-S solution, the sodium salt of 4-(2,3-dihydrothieno-[3,4-b][1,4]dioxin-2-yl-methoxy)-1-butanesulphonic acid (EDOT-S) was prepared as described by Chevrot et al. (J. Electroanal. Chem. 1998, 443, 217-226) and employed as the monomer.

0.496 g of EDOT-S (1.5 mmol) were dissolved in 18 ml of dist. water under argon. 0.97 g (6.0 mmol) of $FeCl_3$ was then added in one portion. Thereafter, the solution was stirred at room temperature for 8 h, and heated at 100° C. for 3 h, cooled and worked up. For working up, the solution was diluted to about 3 wt. % with dist. water, 9 g of Lewatit® S100 and 9 g of Lewatit® MP 62 were added and the mixture was stirred at room temperature for 4 h. After the ion exchangers had been filtered off, a dark blue polymer solution having a solids content of 2.71% was obtained.

Preparation Example 4

90 g of the PEDOT/PSS dispersion from Preparation Example 2 were stirred with 10 g of ethylene glycol.

Example 1 (Preparation of a Dispersion According to the Invention)

45 g of the PEDOT/PSS dispersion from Preparation Example 2 and 45 g of the PEDOT-S solution from Preparation Example 3 were stirred with 10 g of ethylene glycol.

Example 2 (Preparation of a Dispersion According to the Invention)

81 g of the PEDOT/PSS dispersion from Preparation Example 2 and 9 g of the PEDOT-S solution from Preparation Example 3 were stirred with 10 g of ethylene glycol.

Preparation Example 5 (Production of an Electrode Body for an Aluminium Wound Capacitor)

A porous aluminium foil, formed at 214 V, having dimensions of 131 mm×5 mm (anode foil) and a porous aluminium foil having dimensions of 145 mm×5 mm (cathode foil) were each provided with a contact wire and were then wound up together with two cellulose separator papers and fixed with an adhesive tape. 20 of these oxidized electrode bodies were produced. The separator paper of the oxidized electrode bodies was then carbonized in an oven at 300° C.

Comparative Example 1 (Production of a Solid Electrolyte Layer which is not According to the Invention)

The oxidized electrode bodies from Preparation Example 5 were impregnated in the dispersion from Preparation Example 4 in vacuo under 50 mbar for 5 min. Thereafter, drying was carried out at 120° C. for 20 min and then at 150° C. for 20 min. The impregnation and drying were carried out a further time. The mean electrical values are shown in Table 1.

Example 3 (Production of an Aluminium Wound Capacitor According to the Invention)

The oxidized electrode bodies from Production Example 5 were impregnated in the dispersion from Example 1 in vacuo under 50 mbar for 5 min. Thereafter, drying was carried out at 120° C. for 20 min and then at 150° C. for 20 min. The impregnation and drying were carried out a further time. The mean electrical values are shown in Table 1.

Example 4 (Production of an Aluminium Wound Capacitor According to the Invention)

The oxidized electrode bodies from Production Example 5 were impregnated in the dispersion from Example 2 in vacuo under 50 mbar for 5 min. Thereafter, drying was carried out at 120° C. for 20 min and then at 150° C. for 20 min. The impregnation and drying were carried out a further time. The mean electrical values are shown in Table 1.

TABLE 1

| | Ratio of PEDOT-S:PEDOT | CAP [µF] | ESR [mΩ] | ΔCAP@-40° C. [%] |
|---|---|---|---|---|
| Comparative Example 1 | — | 16.5 | 20.1 | 10.4 |
| Example 3 | 4.3:1 | 19.0 | 19.0 | 9.2 |
| Example 4 | 0.5:1 | 21.4 | 30.1 | 6.9 |

Preparation Example 6 (Preparation of a PEDOT/PSS Dispersion for a Polymeric Outer Layer)

1,736 g of deionized water and 660 g of an aqueous polystyrenesulphonic acid solution having an average molecular weight of 70,000 g/mol and a solids content of 3.8 wt. % were initially introduced into a 5 l glass reactor with a stirrer and thermometer. The reaction temperature was kept between 20 and 25° C. 10.2 g of 3,4-ethylenedioxythiophene were added, while stirring. The solution was stirred for 30 minutes. 0.06 g of iron(III) sulphate and 19 g of sodium persulphate were then added and the solution was stirred for a further 24 hours. After the reaction had ended, for removal of inorganic salts 200 ml of a strongly acid cation exchanger and 500 ml of a weakly basic anion exchanger were added and the solution was stirred for a further 2 h. The ion exchanger was filtered off. The dispersion obtained achieved a solids content of 1.5% by subsequent concentration.

160 g of this dispersion, 28 g of water, 6 g of a sulphopolyester (Eastek 1100, solids content 30%, average molecular weight 10,000-15,000, Eastman), 8 g of dimethylsulphoxide, 1 g of 3-glycidoxypropyltrimethoxysilane (Silquest A-187, OSi Specialties) and 0.4 g of wetting agent (Dynol 604, Air Products) were mixed intensively for one hour in a glass beaker with a stirrer.

Preparation Example 7 (Preparation of a Crosslinking Agent Solution)

4.0 g of p-toluenesulphonic acid monohydrate, 1.7 g of 1,10-diaminodecane and 95.5 g of water were mixed intensively in a glass beaker with a stirrer.

Preparation Example 8 (Production of an Electrode Body for a Tantalum Electrolytic Capacitor)

Tantalum powder having a specific capacitance of 18,000 μFV/g was pressed to pellets with inclusion of a tantalum wire and sintered in order to form a porous anode body having dimensions of 1.5 mm×2.9 mm×4.0 mm. 5 of these porous anode bodies were anodized in a phosphoric acid electrolyte at 100 V to form a dielectric, in order to obtain the capacitor bodies.

Preparation Example 9

The dispersion from Preparation Example 1 was diluted to a concentration of 2.08% by addition of deionized water. 96 g of this dispersion were stirred with 4 g of dimethylsulphoxide (DMSO).

Preparation Example 10

The solution from Preparation Example 3 was diluted to a concentration of 2.08% by addition of deionized water. 96 g of this solution were stirred with 4 g of dimethylsulphoxide (DMSO).

Example 5 (Preparation of a Dispersion According to the Invention)

100 g of the solution from Preparation Example 9 were stirred with 100 g of the dispersion from Preparation Example 10.

Comparative Example 2 (Production of a Solid Electrolyte Layer which is not According to the Invention (Referred to as VB2))

The capacitor bodies from Preparation Example 8 were impregnated in the dispersion from Preparation Example 9 for 1 min. Thereafter, drying was carried out at 120° C. for 10 min. The impregnation and drying were carried out nine further times.

The capacitor bodies were then impregnated in the solution from Preparation Example 7. Thereafter, drying was carried out at 120° C. for 10 min. The capacitor body was then impregnated in the dispersion from Preparation Example 6. Thereafter, drying was carried out at 120° C. for 10 min.

The capacitor bodies were then impregnated in the solution from Preparation Example 7. Thereafter, drying was carried out at 120° C. for 10 min. The capacitor body was then impregnated in the dispersion from Preparation Example 6. Thereafter, drying was carried out at 120° C. for 10 min.

The capacitor bodies were then impregnated in the solution from Preparation Example 7. Thereafter, drying was carried out at 120° C. for 10 min. The capacitor body was then impregnated in the dispersion from Preparation Example 6. Thereafter, drying was carried out at 120° C. for 10 min.

The capacitor bodies were then covered with a graphite layer and thereafter with a silver layer in order to obtain the finished capacitors in this way.

Comparative Example 3 (Production of a Solid Electrolyte Layer which is not According to the Invention (Referred to as VB3))

The treatment of the capacitor bodies was carried out as described in Comparative Example 2, but the solution from Preparation Example 10 was used instead of the dispersion from Preparation Example 9.

Example 6 (Referred to as B6)

The treatment of the capacitor bodies was carried out as described in Comparative Example 2, but the dispersion from Example 5 was used instead of the dispersion from Preparation Example 9.

TABLE 2

| | Ratio of PEDOT-S:PEDOT | CAP [μF] | ESR [mΩ] | ΔCAP@-40° C. [%] |
| --- | --- | --- | --- | --- |
| VB2 | — | 16.2 | 46.0 | 13.6 |
| VB3 | — | 17.5 | 312.7 | 9.2 |
| B6 | 3.5:1 | 17.5 | 74.5 | 7.7 |

LIST OF REFERENCE SYMBOLS

1 Electrode body
2 Electrode material
3 Dielectric
4 Surface
5 Anode body
6 Solid electrolyte
7 Capacitor body

The invention claimed is:
1. A method for the production of a capacitor, the method comprising:
   (a) providing an electrode body of an electrode material, wherein a dielectric covers one surface of the electrode material at least partly thereby forming an anode body;
   (b) introducing a dispersion comprising a dispersing agent, a foreign-doped conductive polymer and counter-ions which are not covalently bonded to the foreign-doped conductive polymer into at least a part of the anode body;
   (c) removing at least part of the dispersing agent thereby obtaining a solid electrolyte in a capacitor body of the capacitor;
   wherein a self-doped conductive polymer is additionally introduced into at least a part of the anode body.
2. The method of claim 1, wherein the foreign-doped conductive polymer is poly(3,4-ethylenedioxythiophene).
3. The method of claim 1, wherein the counter-ions are present as polyanions.

4. The method of claim 3, wherein the polyanion is a polystyrenesulphonic acid.

5. The method of claim 1, wherein the dispersion comprises ionic complexes of poly(3,4-ethylenedioxythiophene) and polystyrenesulphonic acid.

6. The method of claim 1, wherein the self-doped polythiophene comprises recurring units of the formula (I)

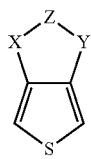

(I)

in which
X, Y are identical or different and denote O, S, N—$R^1$,
Z denotes —$(CH_2)_m$—$CR^2R^3$—$(CH_2)_n$—,
$R^1$ denotes aryl, $C_1$-$C_{18}$-alkyl or hydrogen,
$R^2$ denotes hydrogen or —$(CH_2)s$-O—$(CH_2)_p$—$SO_3^-M^+$,
$R^3$ denotes —$(CH_2)s$-O—$(CH_2)_p$—$SO_3^-M^+$,
$M^+$ denotes a cation,
m, n are identical or different and denote an integer from 0 to 3,
s denotes an integer from 0 to 10 and
p denotes an integer from 1 to 18.

7. The method of claim 6, wherein
X, Y denote O,
Z denotes —$(CH_2)_m$—$CR^2R^3$—$(CH_2)_n$—,
$R^2$ denotes hydrogen or —$(CH_2)s$-O—$(CH_2)_p$—$SO_3^-M^+$,
$R^3$ denotes —$(CH_2)s$-O—$(CH_2)_p$—$SO_3^-M^+$,
$M^+$ denotes a cation,
m, n are identical or different and denote an integer from 0 to 3,
s denotes an integer from 0 to 10 and
p denotes an integer from 1 to 18.

8. The method of claim 6, wherein
X, Y denote O,
Z denotes —$(CH_2)$—$CR^2R^3$—$(CH_2)_n$—,
$R^2$ denotes hydrogen,
$R^3$ denotes —$(CH_2)s$-O—$(CH_2)_p$—$SO_3^-M^+$,
$M^+$ denotes $Na^+$ or $K^+$,
n denotes 0 or 1,
s denotes 0 or 1 and
p denotes 3, 4 or 5.

9. The method of claim 1, wherein the self-doped conductive polymer is introduced into at least a part of the anode body in the form of a solution or dispersion, before the dispersion is introduced into at least a part of the anode body according to process step (b).

10. The method of claim 1, wherein the self-doped conductive polymer is introduced into at least a part of the anode body in the form of a solution or dispersion, after the dispersion is introduced into at least a part of the anode body according to process step (b).

11. The method of claim 1, wherein the self-doped conductive polymer is contained in the dispersion which is introduced into at least a part of the anode body according to process step (b).

12. The method of claim 1, wherein the self-doped conductive polymer is introduced into at least a part of the anode body in an amount such that the weight ratio of self-doped polymer to foreign-doped polymer in the solid electrolyte is in a range of from 100:1 to 1:100.

13. A capacitor obtainable by the method of claim 1.

14. A capacitor comprising an electrode body of an electrode material, wherein a dielectric at least partly covers the surface of this electrode material and forms an anode body, wherein the anode body is at least partly coated with a solid electrolyte which comprises a foreign-doped conductive polymer, counter-ions which are not covalently bonded to the foreign-doped conductive polymer and a self-doped conductive polymer.

15. The capacitor of claim 14, wherein
the foreign-doped conductive polymer is poly(3,4-ethylenedioxythiophene);
the counter-ions are present as polyanions;
the self-doped conductive polymer comprises recurring units of the formula (I)

(I)

in which
X, Y are identical or different and denote O, S, N—$R^1$,
Z denotes —$(CH_2)_m$—$CR^2R^3$—$(CH_2)_n$—,
$R^1$ denotes aryl, $C_1$-$C_{18}$-alkyl or hydrogen,
$R^2$ denotes hydrogen or —$(CH_2)s$-O—$(CH_2)_p$—$SO_3^-M^+$,
$R^3$ denotes —$(CH_2)s$-O—$(CH_2)_p$—$SO_3^-M^+$,
$M^+$ denotes a cation,
m, n are identical or different and denote an integer from 0 to 3,
s denotes an integer from 0 to 10 and
p denotes an integer from 1 to 18.

16. The capacitor of claim 14, wherein the weight ratio of self-doped polymer to foreign-doped polymer in the solid electrolyte is in a range of from 100:1 to 1:100.

17. An electronic circuit comprising the capacitor of claim 13.

18. A dispersion comprising a self-doped conductive polymer, a foreign-doped conductive polymer and counter-ions which are not covalently bonded to the foreign-doped conductive polymer.

19. The dispersion of claim 18, wherein
the foreign-doped conductive polymer is poly(3,4-ethylenedioxythiophene);
the counter-ions are present as polyanions;
the self-doped conductive polymer comprises recurring units of the formula (I)

(I)

in which
X, Y are identical or different and denote O, S, N—$R^1$,
Z denotes —$(CH_2)_m$—$CR^2R^3$—$(CH_2)_n$—,
$R^1$ denotes aryl, $C_1$-$C_{18}$-alkyl or hydrogen,
$R^2$ denotes hydrogen or —$(CH_2)s$-O—$(CH_2)_p$—$SO_3^-M^+$,
$R^3$ denotes —$(CH_2)s$-O—$(CH_2)_p$—$SO_3^-M^+$, $M^+$ denotes a cation, m, n are identical or different and denote an integer from 0 to 3, s denotes an integer from 0 to 10 and p denotes an integer from 1 to 18.

\* \* \* \* \*